(12) United States Patent
Chiang et al.

(10) Patent No.: US 12,455,195 B2
(45) Date of Patent: Oct. 28, 2025

(54) INFRARED SENSOR

(71) Applicant: HON HAI PRECISION INDUSTRY CO., LTD., New Taipei (TW)

(72) Inventors: Kuang-Hao Chiang, Taoyuan (TW); Shang-Yu Chuang, Hsinchu County (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 783 days.

(21) Appl. No.: 17/659,333

(22) Filed: Apr. 15, 2022

(65) Prior Publication Data
US 2023/0304867 A1 Sep. 28, 2023

(30) Foreign Application Priority Data
Mar. 23, 2022 (TW) .................................. 111110929

(51) Int. Cl.
*G01J 5/20* (2006.01)

(52) U.S. Cl.
CPC ........... *G01J 5/20* (2013.01); *G01J 2005/202* (2013.01)

(58) Field of Classification Search
None
See application file for complete search history.

(56) References Cited

U.S. PATENT DOCUMENTS

| | | | |
|---|---|---|---|
| 7,262,412 B2 | 8/2007 | Schimert et al. | |
| 7,576,361 B2 | 8/2009 | Agranov et al. | |
| 10,877,195 B2 | 12/2020 | Mori et al. | |
| 2010/0117126 A1* | 5/2010 | Takahashi | H10F 39/014 |
| | | | 257/292 |
| 2010/0196655 A1* | 8/2010 | Kai | H05K 9/0096 |
| | | | 428/110 |
| 2011/0266443 A1 | 11/2011 | Schimert et al. | |
| 2012/0061572 A1* | 3/2012 | Hannebauer | G01J 5/24 |
| | | | 250/338.4 |
| 2013/0181258 A1* | 7/2013 | JangJian | H10F 39/199 |
| | | | 257/443 |
| 2015/0226613 A1 | 8/2015 | Bauer et al. | |

FOREIGN PATENT DOCUMENTS

| | | |
|---|---|---|
| CN | 1971388 A | 5/2007 |
| CN | 101052862 A | 10/2007 |
| CN | 101656298 A | 2/2010 |
| CN | 102272563 A | 12/2011 |
| CN | 113671525 A | 11/2021 |

(Continued)

*Primary Examiner* — Erica S Lin
(74) *Attorney, Agent, or Firm* — CKC & Partners Co., LLC

(57) ABSTRACT

An infrared sensor includes a substrate, an active pixel array, a reference pixel array, a light absorbing layer, a sidewall spacer, and a shading layer. The active pixel array is over the substrate. The reference pixel is over the substrate, adjacent to the active pixel array, and having a reference pixel. The reference pixel includes a platform, a resistor, and an infrared sensing material layer. The resistor is on the platform. The infrared sensing material layer is over the resistor. The light absorbing layer is over the reference pixel. The sidewall spacer is over the reference pixel and extends along a sidewall of the light absorbing layer. The shading layer is conformally formed over the light absorbing layer and the sidewall spacer.

10 Claims, 18 Drawing Sheets

(56) References Cited

FOREIGN PATENT DOCUMENTS

| | | | |
|---|---|---|---|
| CN | 113735053 | A | 12/2021 |
| EP | 3299423 | A1 | 3/2018 |
| JP | 2001215152 | A | 8/2001 |
| TW | 1336394 | B | 1/2011 |
| TW | 201142251 | A | 12/2011 |
| WO | 2011129307 | A1 | 10/2011 |

* cited by examiner

INFRARED SENSOR

CROSS-REFERENCE TO RELATED APPLICATION

This application claims priority to Taiwan Application Serial Number 111110929, filed Mar. 23, 2022, which is herein incorporated by reference in its entirety.

BACKGROUND

Field of Invention

The present invention relates to an infrared sensor.

Description of Related Art

An uncooled infrared focal plane array thermometer includes infrared optical active pixels and infrared optical blind reference pixels. The uncooled infrared focal plane array can operate at ambient temperature and may not include active temperature stabilization. The infrared optical blind reference pixels on the uncooled infrared focal plane arrays do not absorb incident infrared radiation. The infrared optical blind reference pixel can be used to determine the ambient temperature of the infrared focal plane array to calibrate the infrared optical active pixel within an operating temperature range of the infrared focal plane array. Therefore, the infrared optical blind reference pixels on the uncooled IR focal plane array can correct images due to the effects of ambient temperature drift.

SUMMARY

The invention provides an infrared sensor. The infrared sensor includes a substrate, an active pixel array, a reference pixel array, a light absorbing layer, a sidewall spacer, and a shading layer. The active pixel array is over the substrate. The reference pixel is over the substrate, adjacent to the active pixel array, and having a reference pixel. The reference pixel includes a platform, a resistor, and an infrared sensing material layer. The resistor is on the platform. The infrared sensing material layer is over the resistor. The light absorbing layer is over the reference pixel. The sidewall spacer is over the reference pixel and extends along a sidewall of the light absorbing layer. The shading layer is conformally formed over the light absorbing layer and the sidewall spacer.

The invention provides an infrared sensor. The infrared sensor includes a substrate, a reference pixel array, a light absorbing layer, a spacer, and a light shielding metal layer. The reference pixel array is over the substrate and has a first reference pixel and a second pixel adjacent to the first reference pixel. The light absorbing layer extends across the first and second reference pixels and has a lateral strip and a protruding strip on the lateral strip. The spacer extends along a sidewall of the protruding strip of the light absorbing layer. The light shielding metal layer is conformally formed over the protruding strip of the light absorbing layer and the first spacer.

The invention provides a method for forming an infrared sensor. The method includes depositing an infrared sensing material layer over a platform of a reference pixel including a resistor; depositing a light absorbing layer over the infrared sensing material layer; patterning the light absorbing layer to form a lateral light absorbing portion and a protruding light absorbing portion on the lateral light absorbing portion; forming a spacer on a sidewall of the protruding light absorbing portion; comformally depositing a light shielding layer over the protruding light absorbing portion and the spacer.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
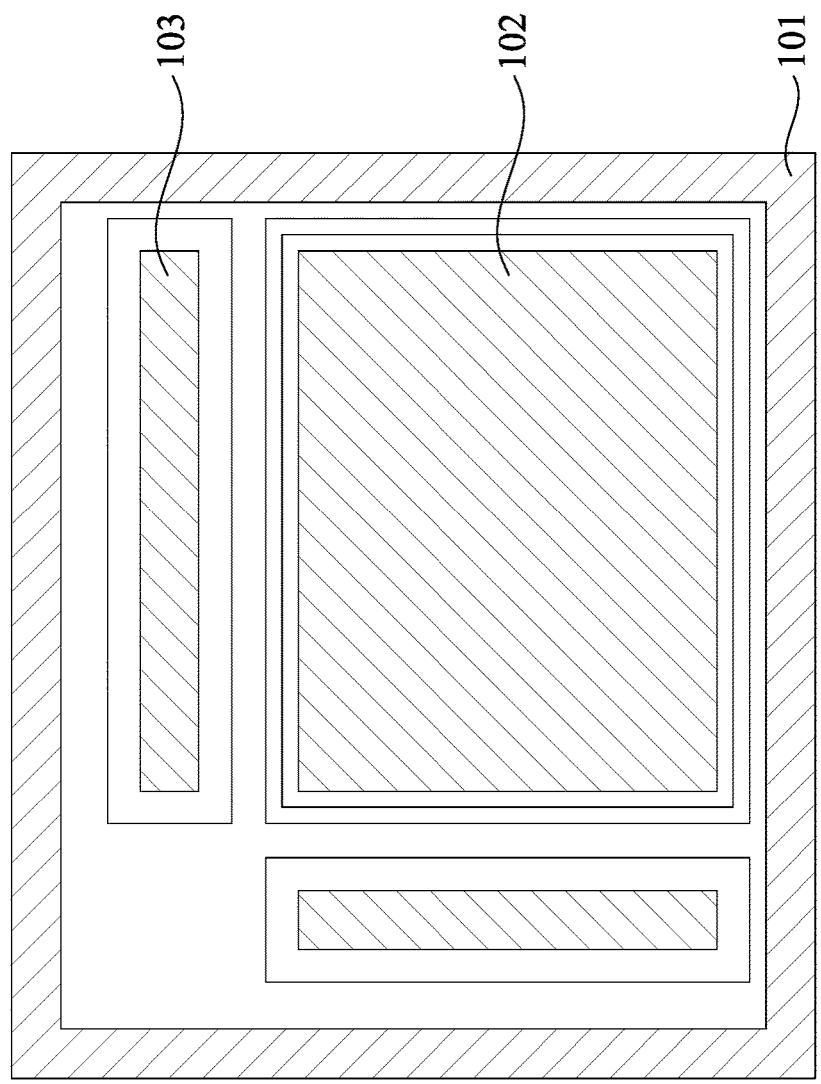
FIG. 1 illustrates a top view of an infrared sensor in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 illustrates a top view of an infrared sensor 100 in accordance with some embodiments of the present disclosure. In some embodiments, the infrared sensor 100 can be interchangeably referred to an uncooled infrared focal plane array thermometer, and can be used on a thermal radiation thermometer chip structure. The infrared sensor 100 includes a substrate 101, an active pixel array 102, and a reference pixel array 103. In some embodiments, the active pixel array 102 can be interchangeably referred to an infrared optical active pixel array, and the reference pixel array 103 can be interchangeably referred to an infrared optical reference pixel array or an infrared optical compensation pixel array. The active pixel array 102 is over the substrate 101 and is coupled to a readout integrated circuit on substrate 101. The reference pixel array 103 is over the substrate 101 and adjacent to the active pixel array 102.

Figure 2:
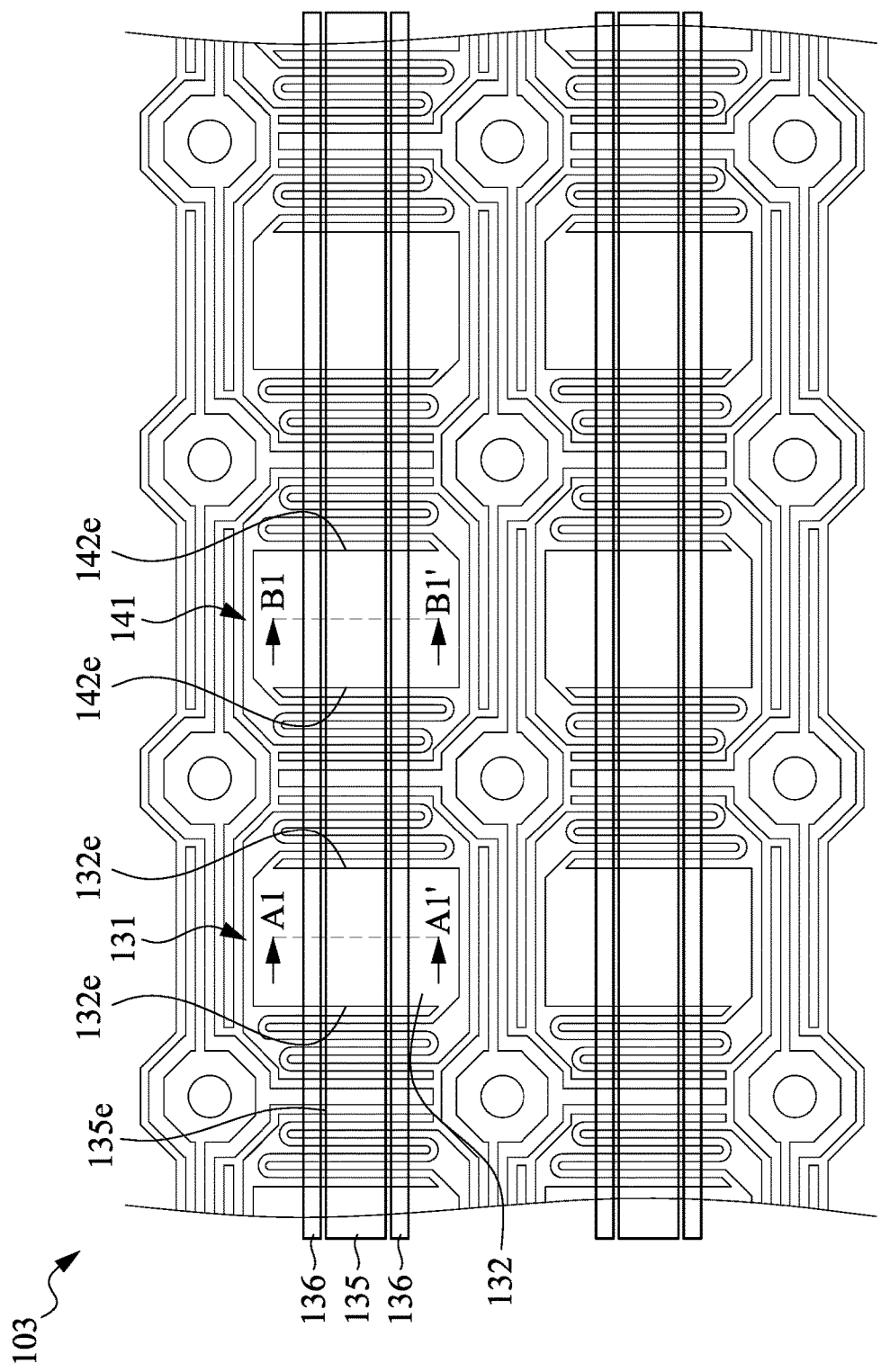
FIG. 2 illustrates a local enlarged top view of a reference pixel array of an infrared sensor in accordance with some embodiments of the present disclosure.
Figure 3:
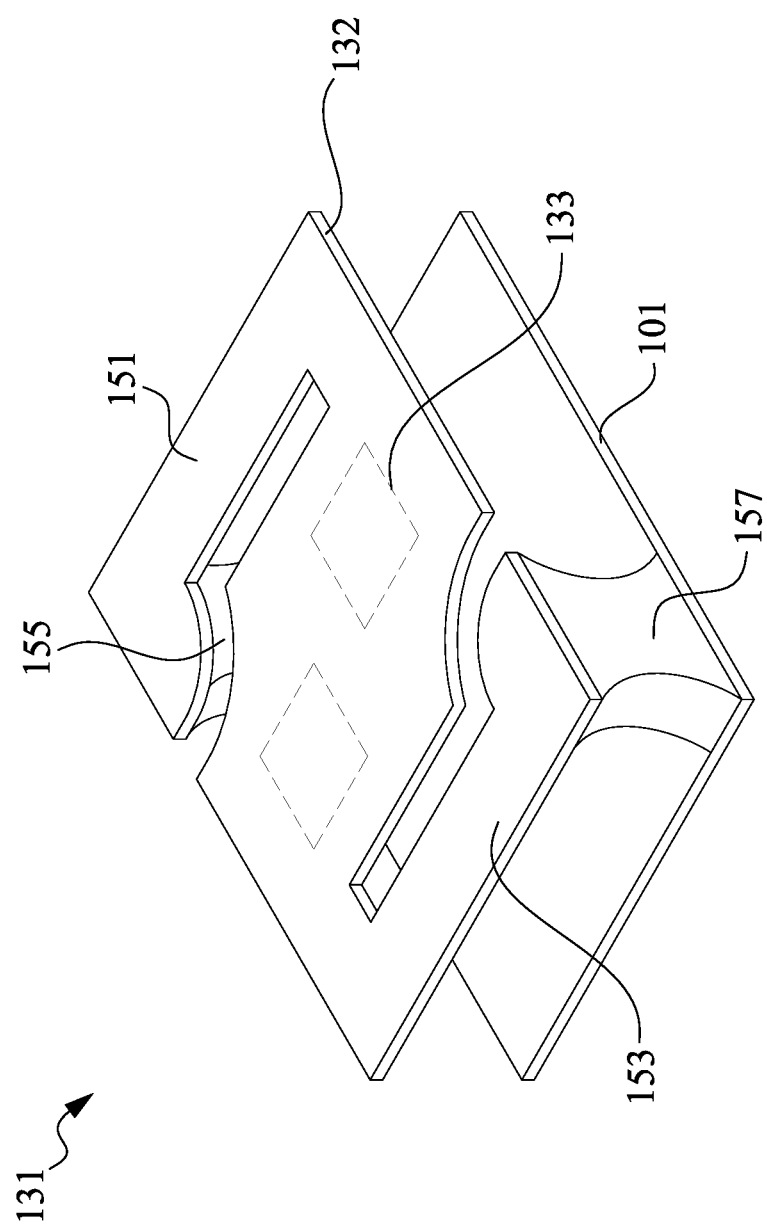
FIG. 3 illustrates a perspective view of a reference pixel of a reference pixel array in accordance with some embodiments of the present disclosure.
Figure 4A:
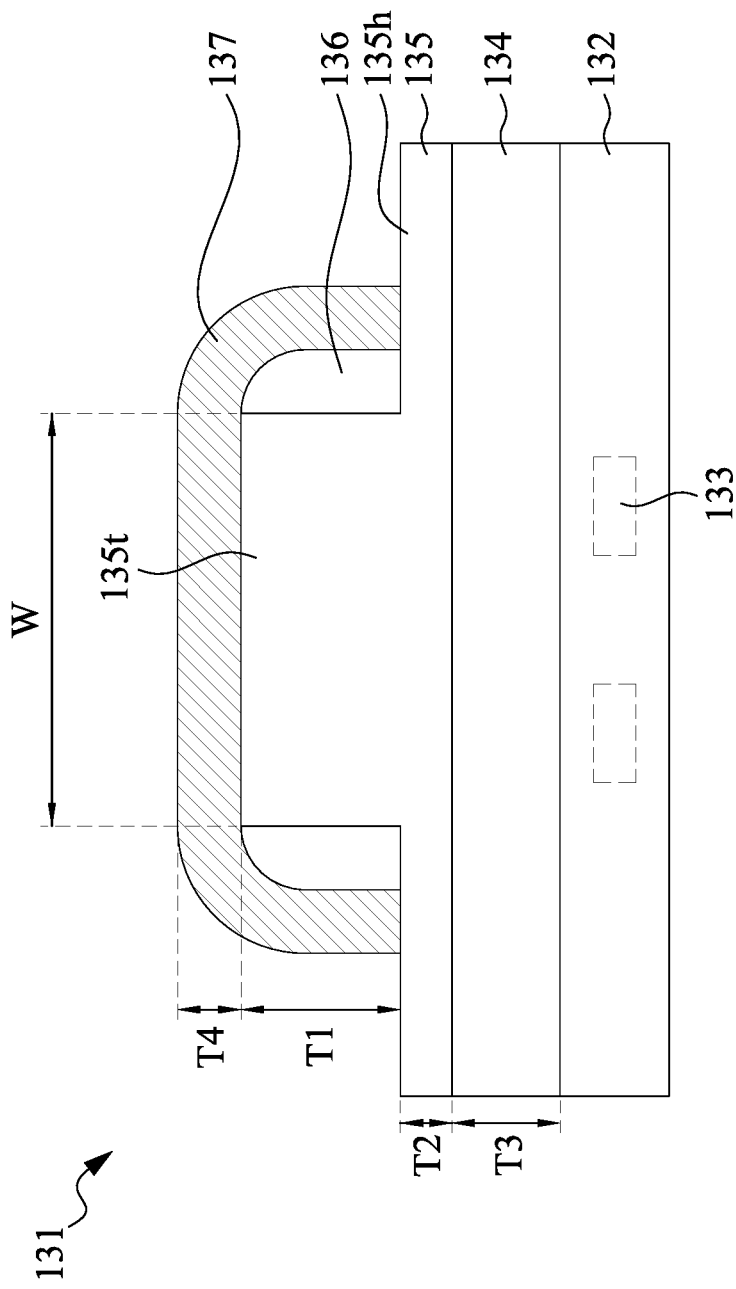
FIGS. 4A and 4B illustrate cross sectional views along line A1-A1' and B1-B1' in FIG. 2, respectively.

The materials and positional relationships of elements in a plurality of active pixels of the active pixel array 102 are substantially the same as those of the reference pixel array 103 in the descriptions associated with FIGS. 2, 3, and 4A, and therefore for the purpose of clarity, reference may be made to relevant paragraphs without further description. Since the reference pixel array 103 is coupled to the readout integrated circuit on the substrate 101 as an electrical reference point, the reference pixel array 103 includes additional elements compared to the active pixel array 102 to make it non-light absorbing or non-heat-gathering properties. For example, the difference between the reference pixel array 103 and the active pixel array 102 is at least that the reference pixel array 103 can be covered with an additional metal layer, so that light cannot enter the reference pixel array 103, and the reference pixel array 103 can be used as an electrical reference point.

Figure 4B:
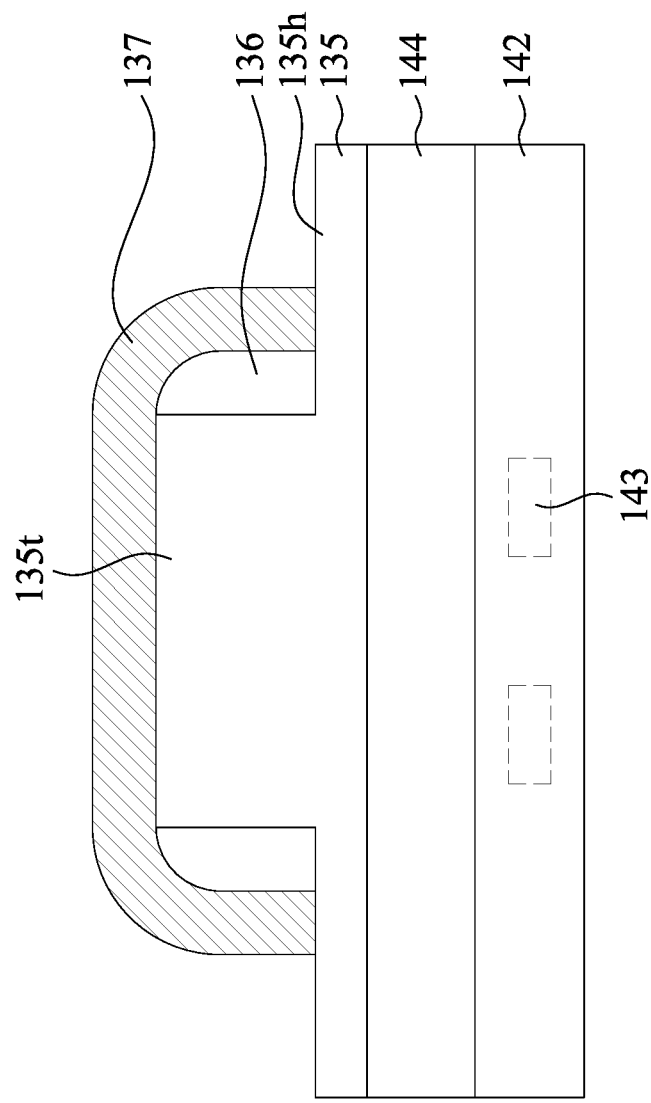

Reference is made to FIGS. 2 to 4B. FIG. 2 illustrates a local enlarged top view of the reference pixel array 103 of the infrared sensor 100 in accordance with some embodiments of the present disclosure. FIG. 3 illustrates a perspective view of a reference pixel 131 of the reference pixel array 103 in accordance with some embodiments of the present disclosure. For better understanding of the present disclosure, the reference pixel 131 in FIG. 3 is omitted, as shown in FIG. 4A, the infrared sensing material layer 134, the light absorbing layer 135, the sidewall spacer 136, and the light shielding layer 137. FIGS. 4A and 4B illustrate cross sectional views along line A1-A1' and B1-B1' in FIG. 2, respectively.

As shown in FIG. 2, the reference pixel array 103 can have a plurality of reference pixels 131. As shown in FIGS. 3 and 4A, the reference pixel 131 may include a platform 132, a resistor 133, and an infrared sensing material layer 134 (see FIG. 4A). In FIG. 3, the platform 132 is above the substrate 101 and can be a micro electro mechanical systems (MEMS) floating bridge structure. The platform 132 is attached to the substrate 101 through the relatively long and thin supporting arms 151 and 153 to increase thermal insulation between the substrate 101 and the resistor 133. Therefore, if the reference pixel 131 is not covered with the light absorbing layer 135, the sidewall spacer structure 136, and the light shielding layer 137 (see FIG. 4A), the infrared radiation irradiated on the resistor 133 can heat the resistor 133 without heating the substrate 101 below the resistor 133. In some embodiments, the elongated thermal paths of the supporting arms 151 and 153 may hinder heat transfer between the platform 132 and the substrate 101. The supporting columns 155 and 157 are electrically coupled from the supporting arms 151 and 153 to the corresponding contacts on the substrate 101.

In some embodiments, the platform 132 is formed by silicon micromachining technology, and the thickness of the platform 132 can be thinner so that its thermal mass can be lower. Therefore, the platform 132 can change temperature quickly to produce an acceptable response time for instant thermal imaging. The platform 132 can cooperate with the infrared sensing material layer 134 thereon to enable active pixels in the active pixel array 102 to have the characteristics of absorbing light and gathering heat. In some embodiments, the supporting arms 151 and 153 can be made of silicon nitride or other suitable materials. In some embodiments, supporting columns 155 and 157 can be made of tungsten (W), aluminum (Al), copper (Cu), titanium (Ti), or other suitable materials.

In FIG. 4A, the resistor 133 is on the platform 132. The resistor 133 is coupled to the readout integrated circuit on the substrate 101 through, as shown in FIG. 3, the supporting arms 151 and 153 and the supporting columns 155 and 157. The readout integrated circuit can be used to process signal from each of the reference pixels 131. The resistor 133 can be regarded as an infrared sensing pixel, and the aforementioned pixel (which may also be referred to a reference pixel) and an active circuit (which may also be referred to an active pixel) are electrically connected each other through the readout integrated circuit on the substrate 101.

In FIG. 4A, the infrared sensing material layer 134 is above the resistor 133. The resistor 133 is coupled to the infrared sensing material layer 134. As the temperature of the infrared sensing material layer 134 changes, the resistance of the infrared sensing material layer 134 also changes accordingly. The readout integrated circuit on the substrate 101 (see FIG. 3) can determine the thermal energy that the reference pixel 131 has received by the corresponding resistance change of the reference pixel 131.

As shown in FIG. 4A, the infrared sensor further includes the light absorbing layer 135, the sidewall spacer 136, and the light shielding layer 137. In FIG. 4A, the light absorbing layer 135 is above the infrared sensing material layer 134 and covers the infrared sensing material layer 134 for absorbing the light irradiated to the reference pixel 131. The light absorbing layer 135 extends beyond opposite two edges 132e of the platform 132 (see FIG. 2). The light absorbing layer 135 has a lateral portion 135h and a protruding portion 135t. In some embodiments, a width W of the protruding portion 135t can be substantially equal to or close to a thickness T1 of the protruding portion 135t, so that the light shielding layer 137 formed on the light absorbing layer 135 afterward can be bent at various angles. In some embodiments, the width W of the protruding portion 135t may be greater than the thickness T1 of the protruding portion 135t. In some embodiments, the width W of the protruding portion 135t may be less than or equal to twice the thickness T1 of the protruding portion 135t. In some embodiments, the thickness T1 of the protruding portion 135t may be greater than a thickness T2 of the lateral portion 135h. In some embodiments, the thickness T2 of the lateral portion 135h of the light absorbing layer 135 may be less than a thickness T3 of the infrared sensing material layer 134. In some embodiments, the protruding portion 135t of the light absorbing layer 135 can be interchangeably referred to an elongated protruding light-absorbing structure. The long side 135e (see FIG. 2) of the protruding portion 135t extends beyond the opposite edges 132e of the platform 132 of the reference pixel 131. In some embodiments, the light absorbing layer 135 can be a multi-layer structure.

In FIG. 4A, the sidewall spacer 136 is above the infrared sensing material layer 134 and extends along a sidewall of the light absorbing layer 135. The sidewall spacer 136 can avoid light leakage from the side of the reference pixel 131, thereby avoiding signal drift of the infrared sensor 100 and improving the sensitivity of the infrared sensor 100. The sidewall spacers 136 can also be used to assist the light shielding layer 137 to be formed on the light absorbing layer 135 to have an inverted U-shaped profile from a cross sectional view. In some embodiments, the sidewall spacer 136 extends beyond opposite two edge 132e of the platform 132 of the reference pixel 131 (see FIG. 2). In some embodiments, the sidewall spacer 136 can be made of a material including silicon oxide (SiO2), silicon nitride (SiN), silicon oxynitride (SiON), SiC, SiCN, $SiC_xO_yN_z$, other suitable materials, or combinations thereof. For example, the can be made of silicon oxide. In some embodiments, sidewall spacer 136 can be made of a different material than the light absorbing layer 135. For example, the can be made of silicon oxide, and the light absorbing layer 135 can be made of silicon nitride.

In FIG. 4A, the light shielding layer 137 is conformally formed on a top surface of the protruding portion 135t of the light absorbing layer 135 and the sidewall spacer 137 and further extends to the lateral portion 135h of the light absorbing layer 135 to reflect the light irradiated to the reference pixel 131. The light shielding layer 137 can prevent light leakage from the side surface of the reference pixel 131, thereby avoiding the signal drift of the infrared sensor 100 and improving the sensitivity of the infrared sensor 100. Since the light shielding layer 137 can have an inverted U-shaped profile from the cross sectional view, it is beneficial to reflect light with different incident angles, thereby reducing the chance of light entering the reference pixel 131 and improving the operation accuracy of the reference pixel array 103. In some embodiments, the light shielding layer 137 can extend beyond the opposite two edges 132e of the platform 132 of the reference pixel 131 along an extending direction of the light absorbing layer 135 (see FIG. 2). In some embodiments, the light shielding layer 137 has a thickness T4 less than or greater than the thickness of the light absorbing layer 135. For example, the thickness T4 of the light shielding layer 137 can be less than the thickness T1 of the protruding portion 135t of the light absorbing layer 135 and/or greater than the thickness T2 of the lateral portion 135h of the light absorbing layer 135. In some embodiments, the light shielding layer 137 can be made of a conductive material. For example, the light shielding layer 137 can be made of a material including tungsten (W), aluminum (Al), copper (Cu), titanium (Ti), or other suitable materials.

Reference is made to FIGS. 2 and 4B. As shown in FIG. 2, the reference pixel array 103 further includes a reference pixel 141. The reference pixel 141 is adjacent to the reference pixel 131. As shown in FIG. 4B, the reference pixel 141 can include a platform 142, a resistor 143, and an infrared sensing material layer 144. The materials and positional relationships of elements in the reference pixel 141 are substantially the same as those of the reference pixel 131 in the descriptions associated with FIGS. 3 and 4A, and therefore for the purpose of for clarity, reference may be made to relevant paragraphs without further description. For example, material and manufacturing method of the platform 142, the resistor 143, and the infrared sensing material layer 144 are substantially the same as those of the platform 132, the resistor 133, and the infrared sensing material layer 134 as shown in FIGS. 3 and 4A, and the related detailed descriptions may refer to the foregoing paragraphs, and are not described again herein.

In FIG. 2, the light absorbing layer 135 above the reference pixel 131 extends to the reference pixel 141 and covers the reference pixel 141 for absorbing the light irradiated to the reference pixel 141. In some embodiments, the light absorbing layer 135 extends across opposite two edges 142e of the platform 142. The sidewall spacer 136 above the reference pixel 131 extends along the sidewall of the light absorbing layer 135 and is further located above the reference pixel 141 and spans the opposite two edges 142e of the platform 142 of the reference pixel 141. The light shielding layer 137 (see FIG. 4B) above the reference pixel 131 is conformally formed over a top surface of the light absorbing layer 135 and a sidewall of the sidewall spacer 136 and is further located above the reference pixel 141 and spans the opposite two edges 142e of the platform 142 of the reference pixel 141. Therefore, the light absorbing layer 135 can simultaneously provide the reference pixel 131 and the reference pixel 141 with the effect of absorbing light, and the sidewall spacer 136 and the light shielding layer 137 can simultaneously provide the reference pixel 131 and the reference pixel 141 with the effect of shielding light.

Figure 5:
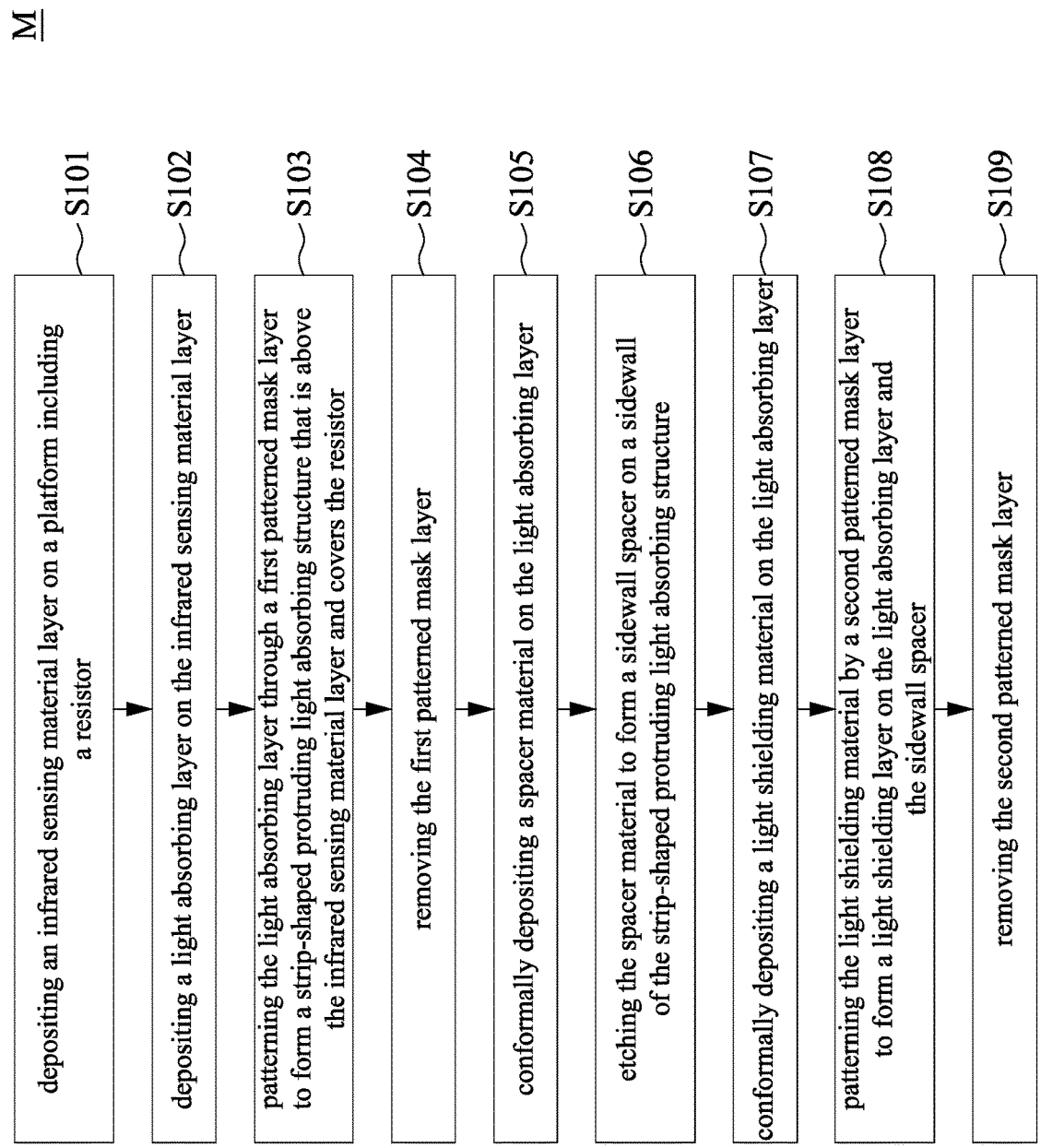
FIG. 5 is a flowchart of a method for forming an infrared sensor in accordance with some embodiments of the present disclosure.
Figure 6:
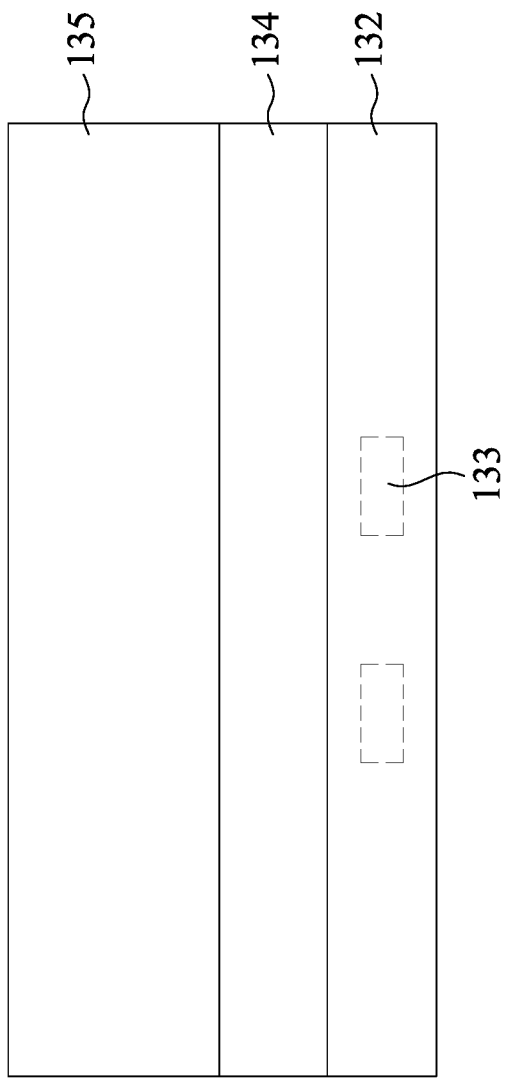
FIGS. 6 to 13 illustrate a method in various stages of forming an infrared sensor in accordance with some embodiments of the present disclosure.

Reference is made to FIG. 5. FIG. 5 is a flowchart of a method M for forming the infrared sensor 100 in accordance with some embodiments of the present disclosure. FIGS. 6 to 13 illustrate the method M in various stages of forming the infrared sensor 100 in accordance with some embodiments of the present disclosure. The method M begins at block S101 where an infrared sensing material layer is deposited on a platform including a resistor. Referring to FIG. 6, in some embodiments of block S101, the infrared sensing material layer 134 is deposited on the platform 132 including a resistor 133. Referring back to FIG. 5, the method M then proceeds to block S102 where a light absorbing layer is deposited on the infrared sensing material layer. With reference to FIG. 6, in some embodiments of block S102, the light absorbing layer 135 is deposited on the infrared sensing material layer 134.

Figure 7:
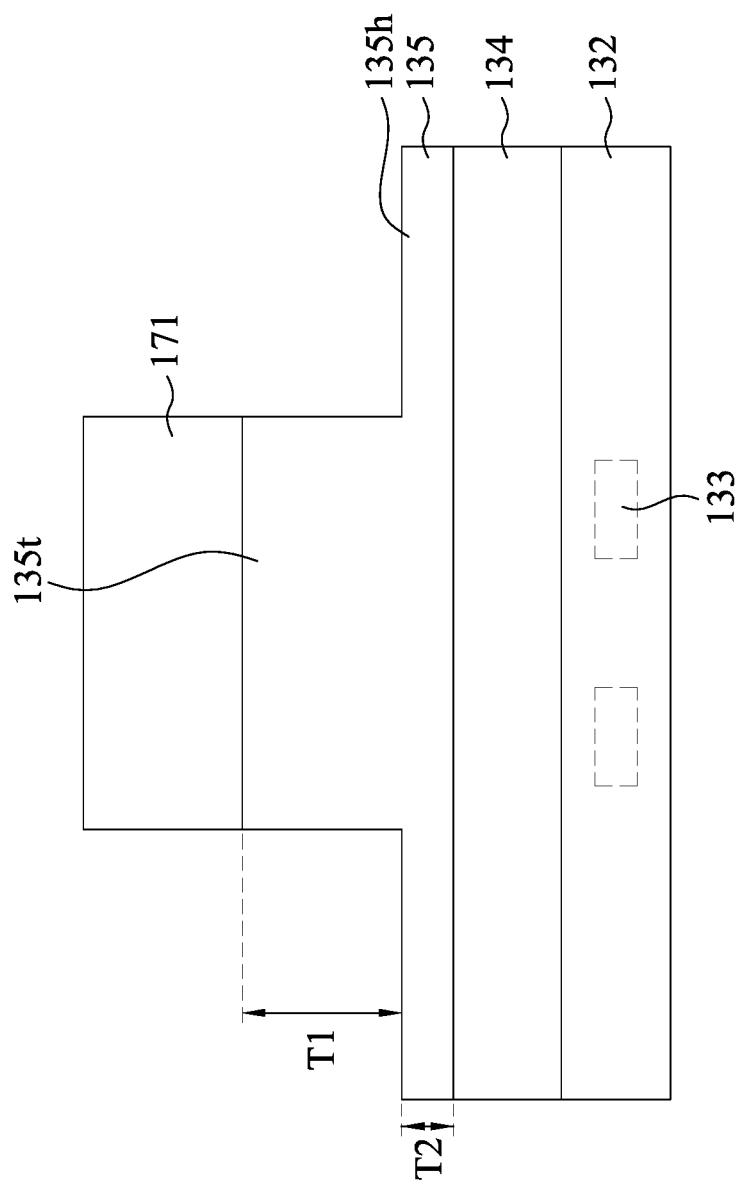

Referring back to FIG. 5, the method M then proceeds to block S103 where the light absorbing layer is patterned through a first patterned mask layer to form a strip-shaped protruding light absorbing structure that is above the infrared sensing material layer and covers the resistor. With reference to FIG. 7, in some embodiments, the light absorbing layer 135 shown in FIG. 6 is patterned to form the lateral portion 135h and the protruding portion 135t that is above the infrared sensing material layer 134 and covers the resistor 133. In some embodiments, the patterned mask layer 171 is formed on the light absorbing layer 135. Subsequently, one or more etch processes are performed using the patterned mask layer 171 as an etch mask. In some embodiments, an etching process is performed to etch a portion of the light absorbing layer 135 exposed by the mask layer 171 until the thickness T2 of the aforementioned portion reaches a desired thickness, so as to form the horizontal portion 135h and the protruding portion 135t on the infrared sensing material layer 134. In some embodiments, an etching process is performed to etch the portion of the light absorbing layer 135 exposed by the mask layer 171 until the infrared sensing material layer 134 below the light absorbing layer 135 is exposed, so that the exposed portion of the light absorbing layer 135 by the patterned mask layer 171 are all removed.

Figure 8:
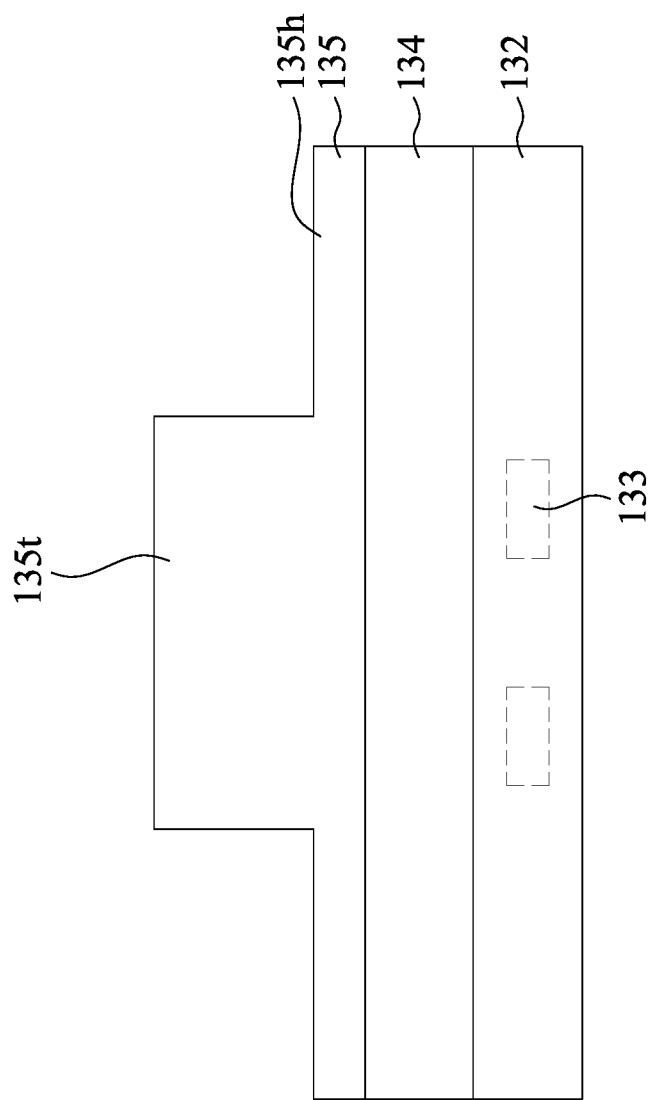

Referring back to FIG. 5, the method M then proceeds to block S104 where the first patterned mask layer is removed. With reference to FIG. 8, in some embodiments, the mask layer 171 shown in FIG. 7 is removed. In some embodiments, if the mask layer 171 includes a photoresist material, the mask layer 171 may be removed by an ashing process.

Figure 9:
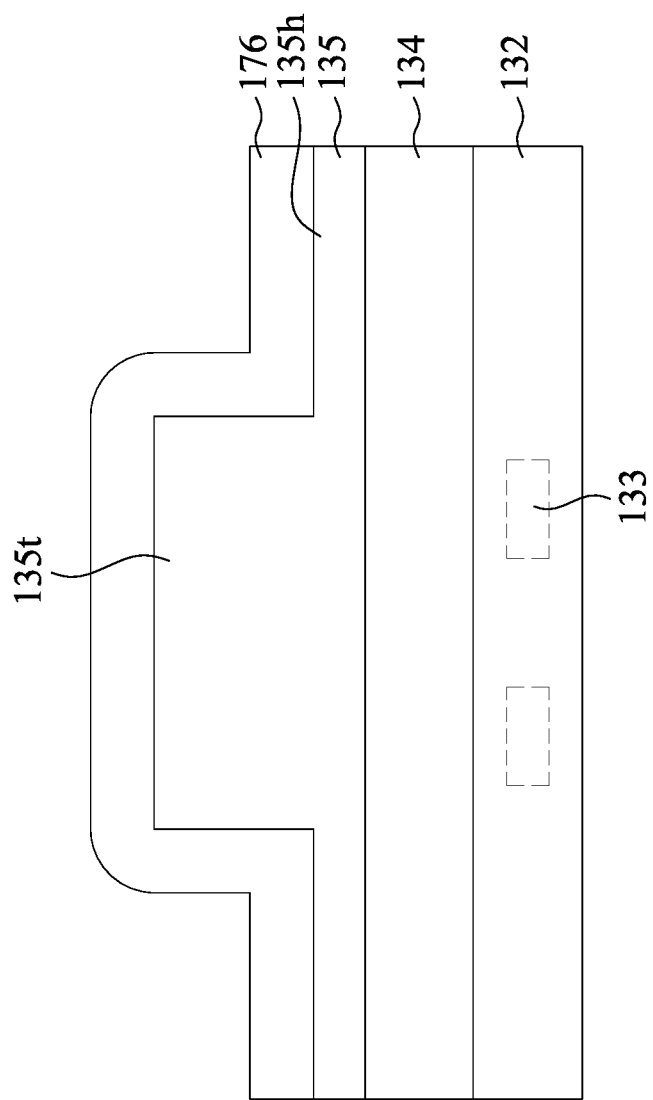

Referring back to FIG. 5, the method M then proceeds to block S105 where a spacer material is conformally deposited on the light absorbing layer. With reference to FIG. 9, in some embodiments, a spacer material 176 is conformally deposited on the light absorbing layer 135.

Figure 10:
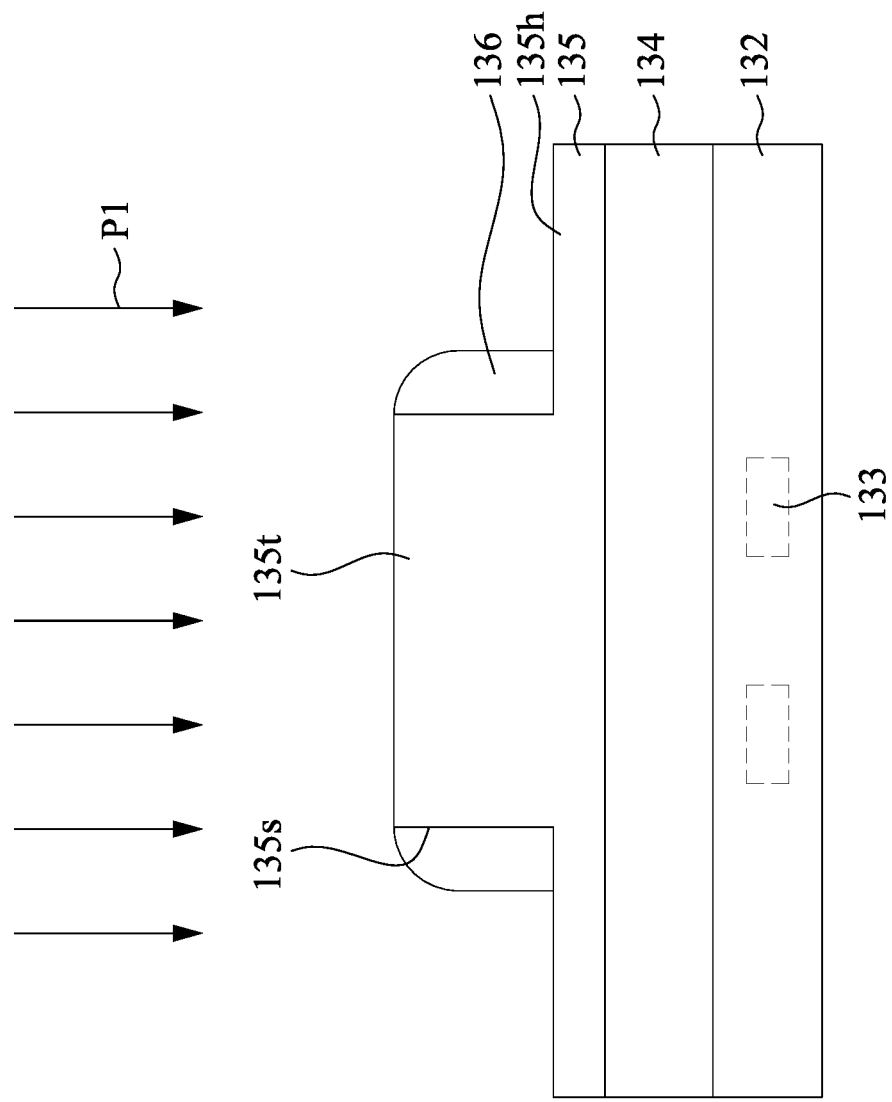

Referring back to FIG. 5, the method M then proceeds to block S106 where the spacer material is etched to form a sidewall spacer on a sidewall of the strip-shaped protruding light absorbing structure. With reference to FIG. 10, in some embodiments, an etching process P1 is performed on the spacer material 176 (see FIG. 9) to form the sidewall spacers 136 on a sidewall 135s of the protruding portion 135t. In some embodiments, the etching process P1 is an anisotropic etching process to remove horizontal portions of the spacer material 176 as shown in FIG. 9. The etching process P1 etches the spacer material 176 at a faster etch rate than etching the light absorbing layer 135. In some embodiments, the spacer material 176 may be etched using, for example, phosphoric acid ($H_3PO_4$).

Figure 11:
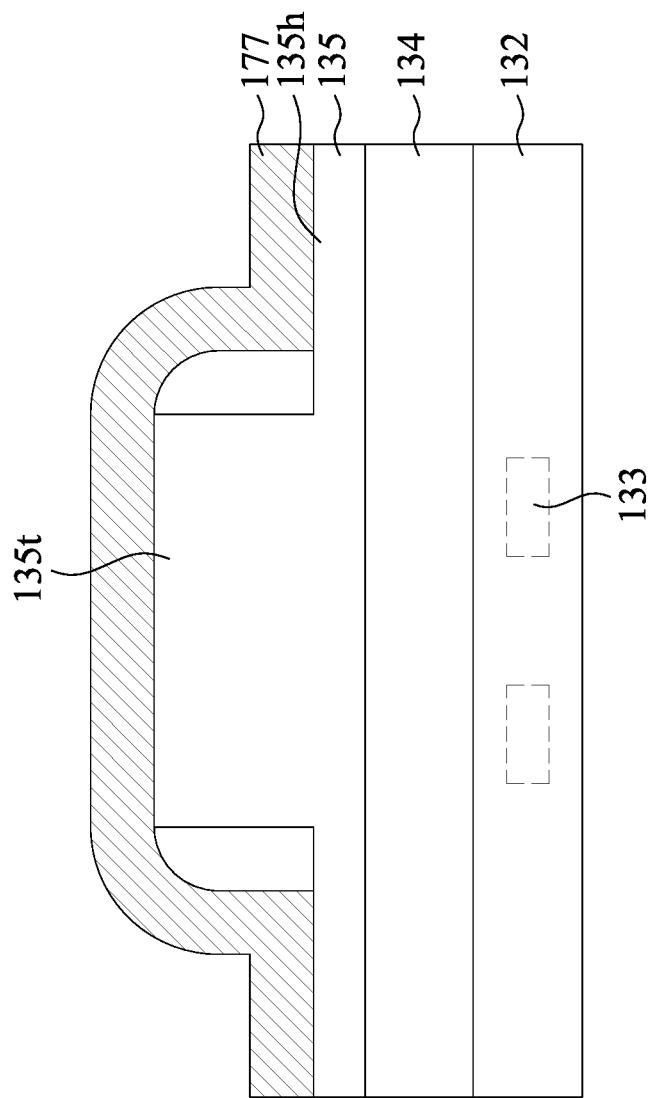

Referring back to FIG. 5, the method M then proceeds to block S107 where a light shielding material is conformally deposited on the light absorbing layer. With reference to FIG. 11, in some embodiments, a light shielding material 177 is conformally deposited on the light absorbing layer 135 and the sidewall spacer 136.

Figure 12:
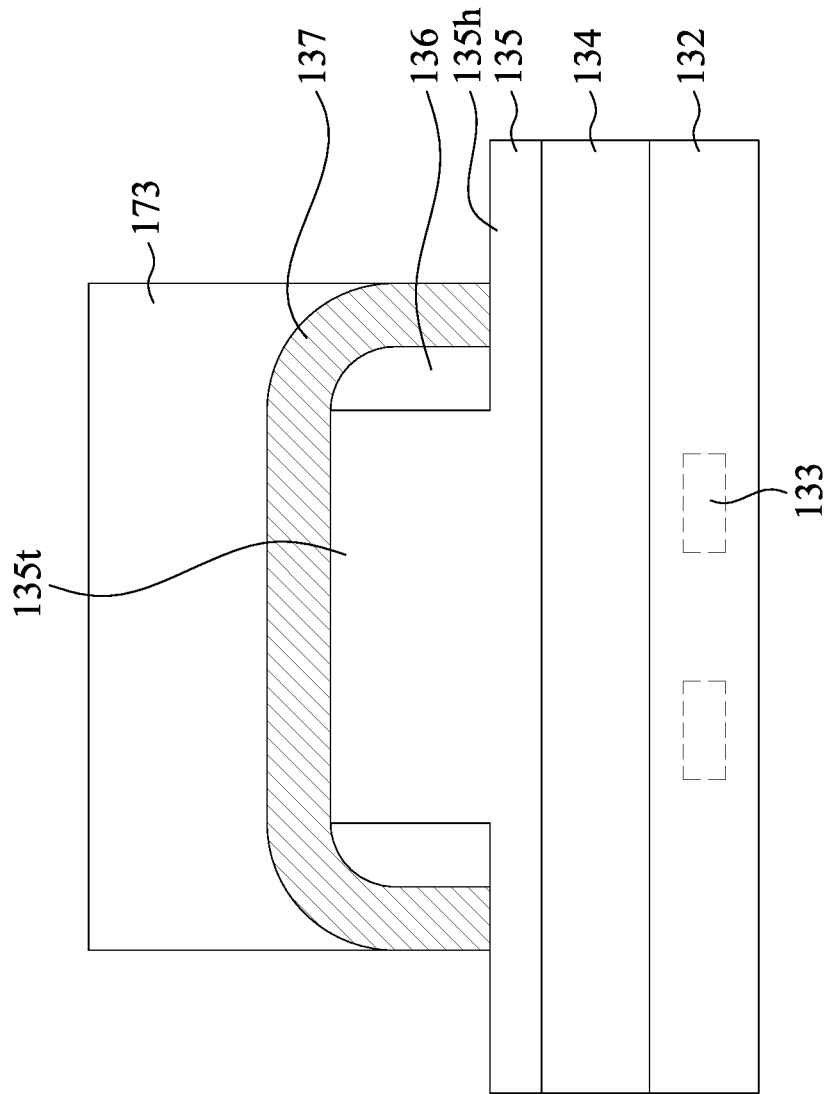

Referring back to FIG. 5, the method M then proceeds to block S108 where the light shielding material is patterned by a second patterned mask layer to form a light shielding layer on the light absorbing layer and the sidewall spacer. With reference to FIG. 12, in some embodiments, the light shielding material 177 (see FIG. 11) is patterned to form the light shielding layer 137 on the light absorbing layer 135 and the sidewall spacer 136. In some embodiments, the patterned mask layer 173 is formed on the light shielding material 177. Subsequently, one or more etching processes are performed using a patterned mask layer 173 as an etch mask to form the light shielding layer 137 on the light absorbing layer 135 and the sidewall spacers 136.

Figure 13:
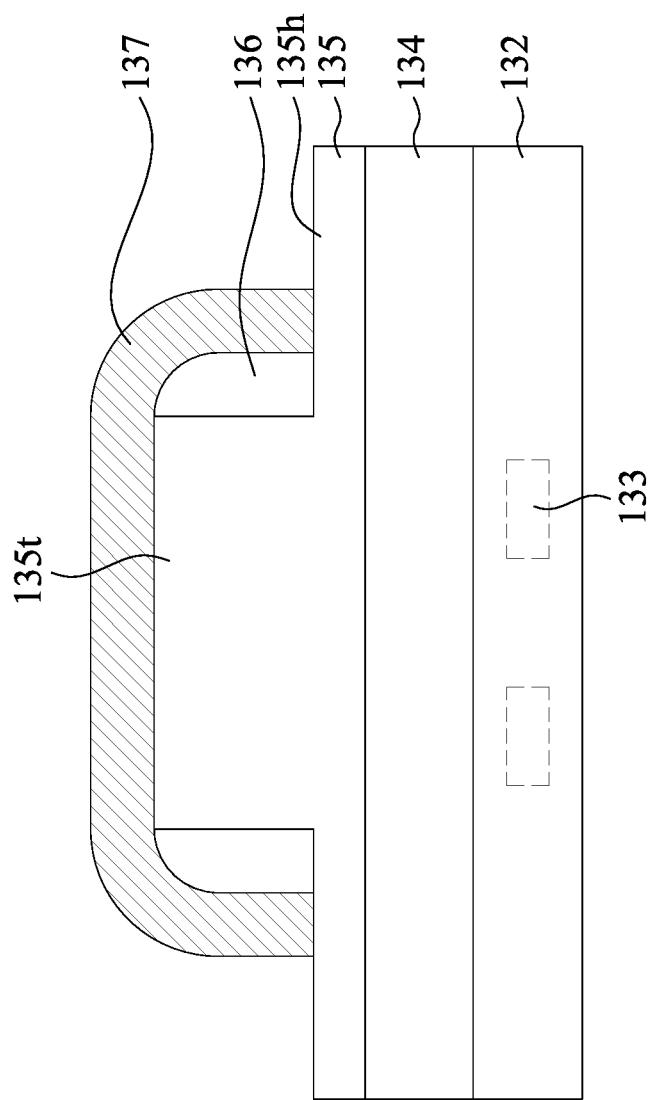

Referring back to FIG. 5, the method M then proceeds to block S109 where the second patterned mask layer is removed. With reference to FIG. 13, in some embodiments, the patterned mask layer shown in FIG. 12 is removed. In some embodiments, if the mask layer 173 includes a photoresist material, the mask layer 173 may be removed by an ashing process.

Figure 14:
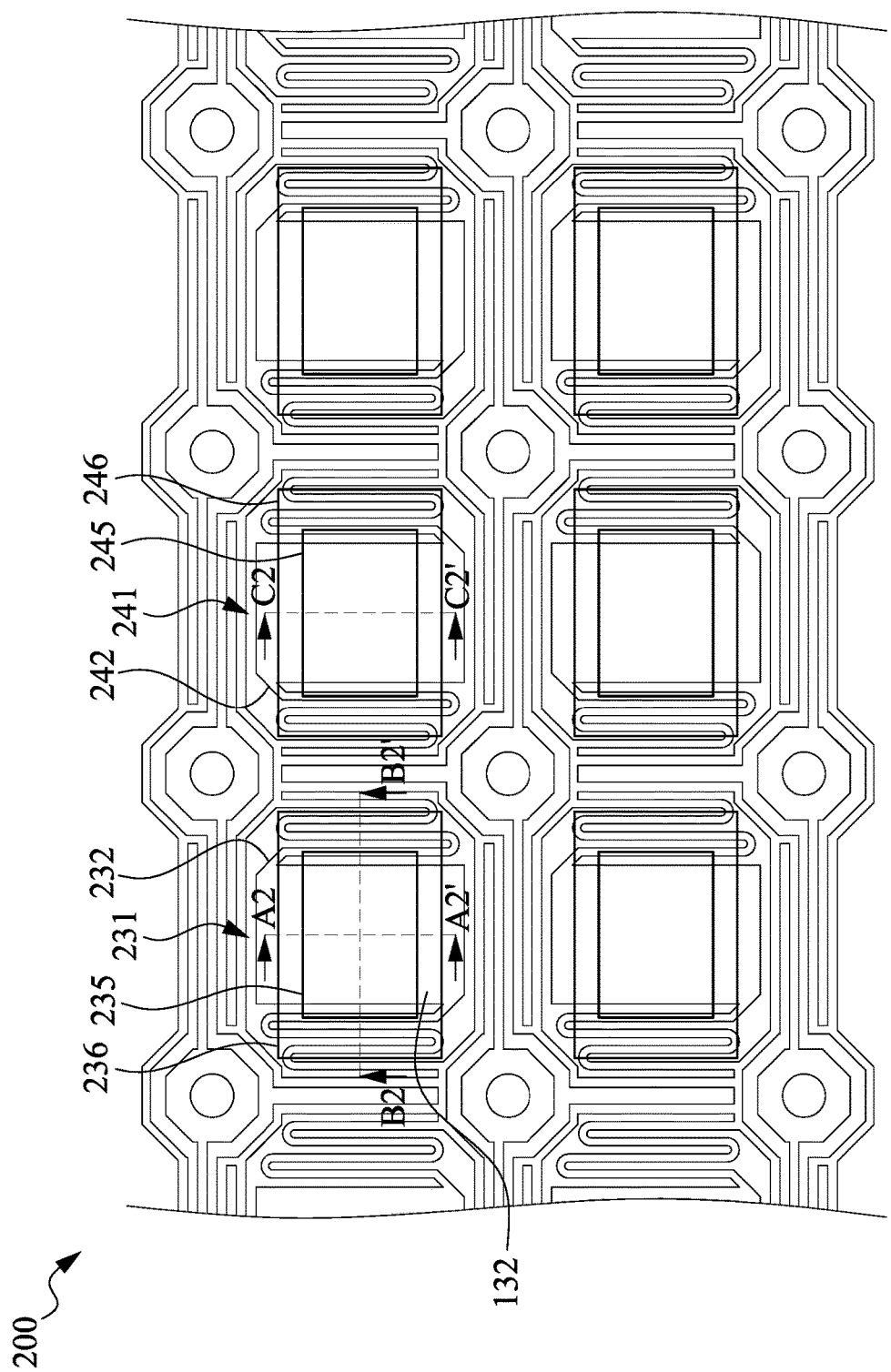
FIG. 14 illustrates a local enlarged top view of a reference pixel array of an infrared sensor in accordance with some embodiments of the present disclosure.
Figure 15A:
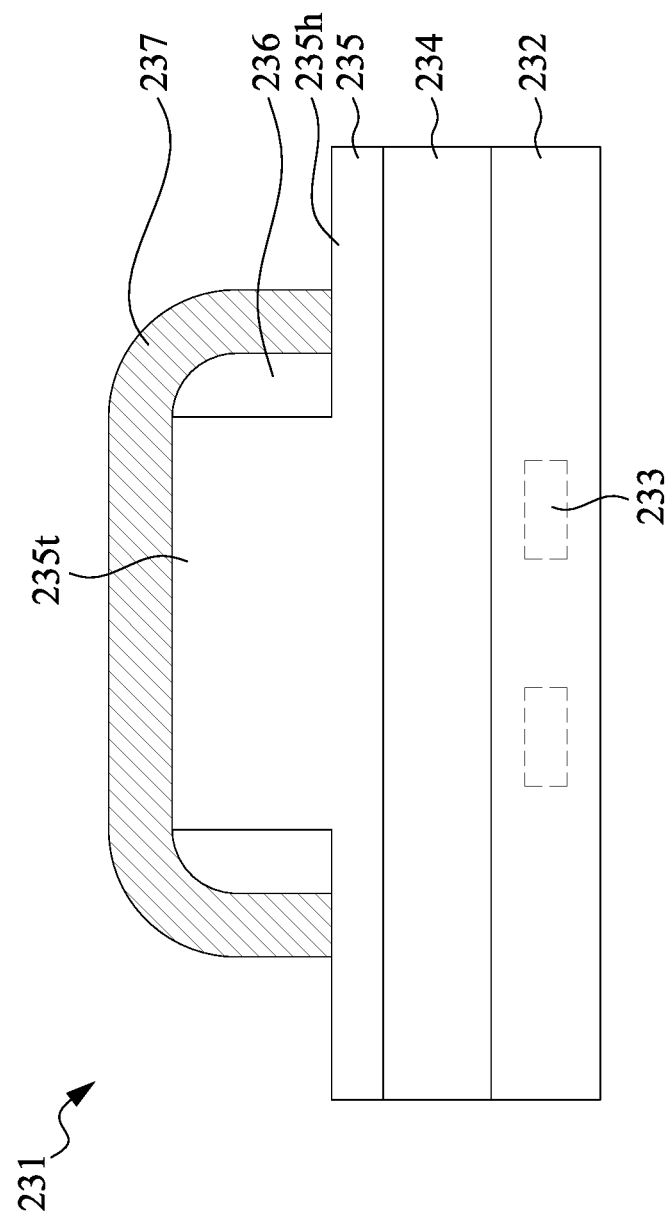
FIGS. 15A, 15B, and 15C illustrate cross sectional views along line A2-A2', B2-B2', and C2-C2' in FIG. 14, respectively.
Figure 15B:
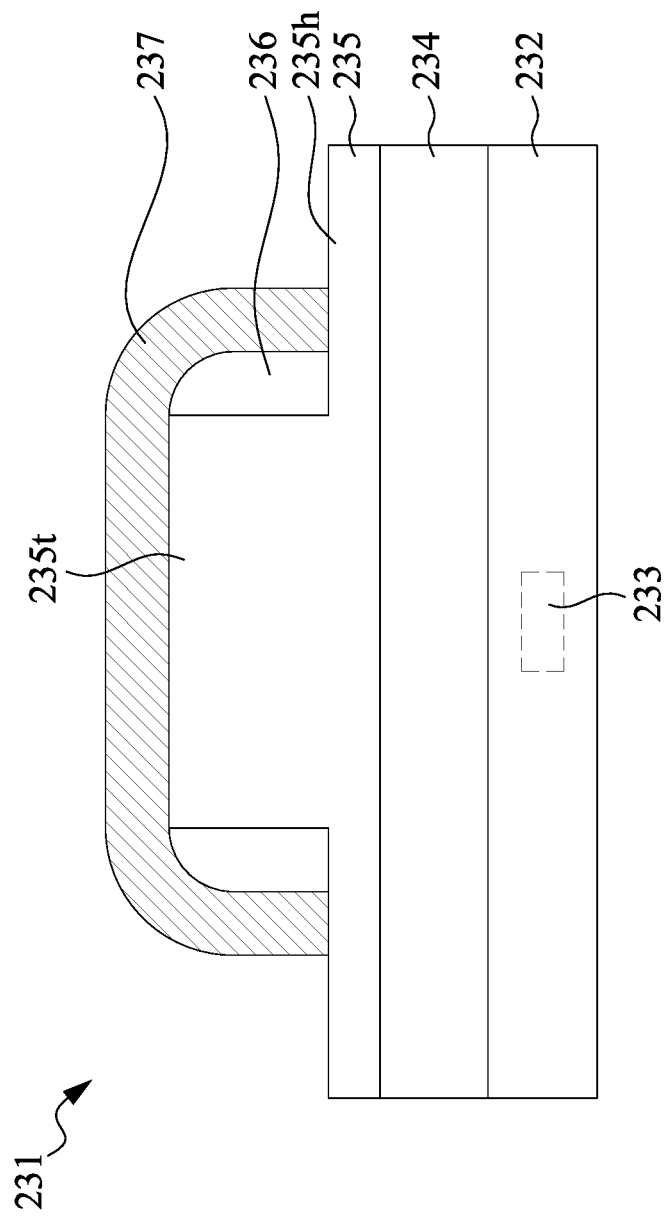
Figure 15C:
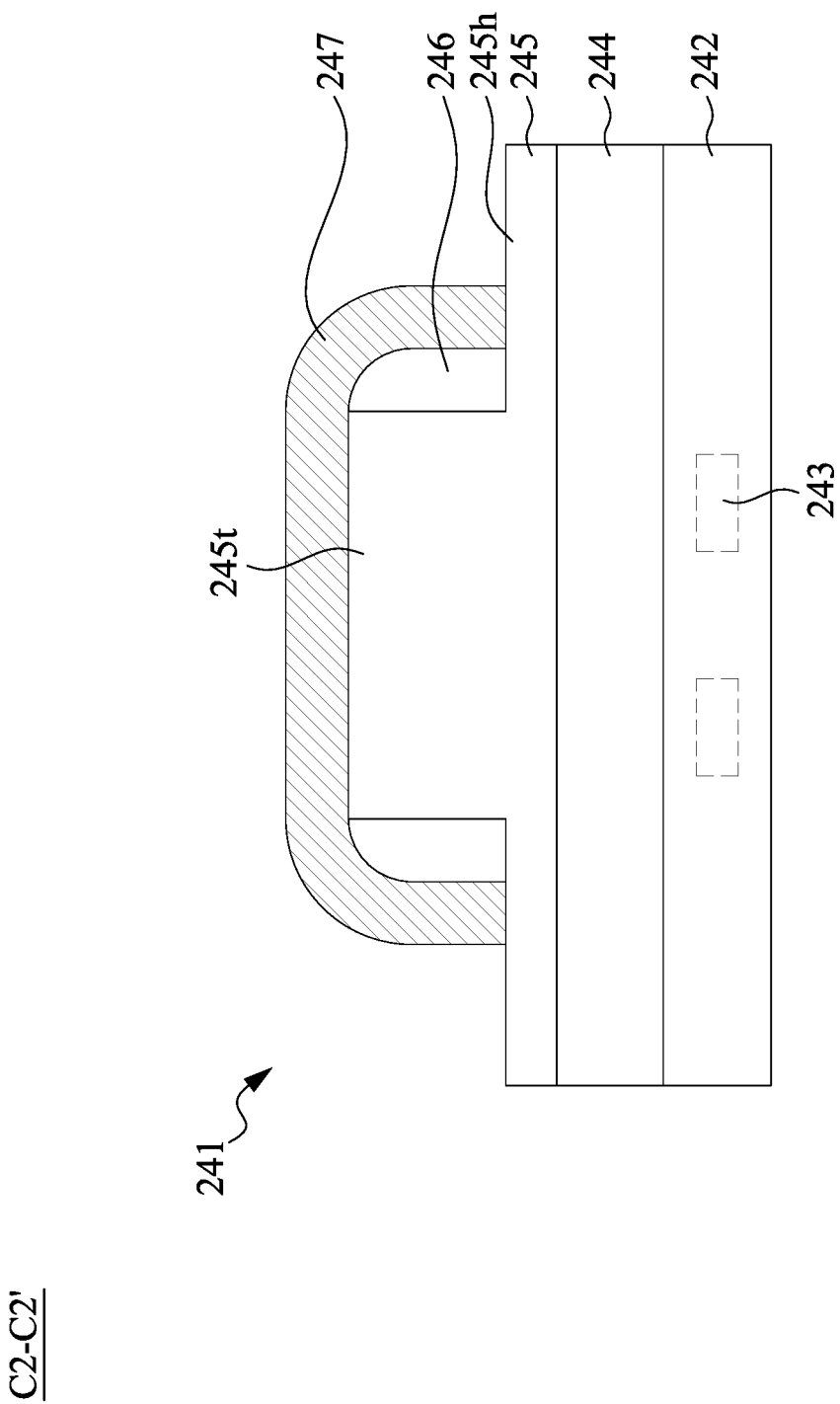

Reference is made to FIGS. 14 to 15C. FIG. 14 illustrates a local enlarged top view of a reference pixel array 203 of an infrared sensor 200 in accordance with some embodiments of the present disclosure. FIGS. 15A, 15B, and 15C illustrate cross sectional views along line A2-A2', B2-B2', and C2-C2' in FIG. 14, respectively.

Materials and manufacturing methods for forming the infrared sensor 200 are substantially the same as those for forming the infrared sensor 100 as shown in FIGS. 2 to 13, and therefore for the purpose of for clarity, reference may be made to relevant paragraphs without further description. For example, materials and manufacturing methods of a reference pixel 231 (see FIG. 14), a platform 232, a resistor 233, an infrared sensing material layer 234, a light absorbing layer 235, a sidewall spacer 236, a light shielding layer 237 (see FIGS. 15A and 15B), a reference pixel 241 (see FIG. 14), a platform 242, a resistor 243, and an infrared sensing material layer 244 (see FIG. 15C) are substantially the same as those of the reference pixel 131, the platform 132, the resistor 133, the infrared sensing material layer 134, the light absorbing layer 135, the sidewall spacer 136, the light shielding layer 137, the reference pixel 141, the platform 142, the resistor 143, and the infrared sensing material layer 144 as shown in FIGS. 2 to 13, and the related detailed descriptions may refer to the foregoing paragraphs, and are not described again herein.

The difference between the embodiment in FIGS. 14 to 15C and the embodiment in FIGS. 2-13 is that the light absorbing layer 235 (see FIG. 14) above the reference pixel 231 does not extend to the adjacent reference pixel 241. In other words, the light absorbing layer 235 non-overlaps the adjacent reference pixel 241. As shown in the top view of FIG. 14, the light absorbing layer 235 is a bulk structure. The sidewall spacer 236 surrounds the light absorbing layer 235 and non-overlaps the reference pixel 241. As shown in cross sectional views of the FIGS. 15A and 15B, a protruding portion 235t of the light absorbing layer 235 has substantially the same width in different cross sectional views. Specifically, as shown in FIG. 15C, the infrared sensor 200 further includes a light absorbing layer 245, a sidewall spacer 246, and a light shielding layer 247. The light absorbing layer 245 is above the infrared sensing material layer 244. The sidewall spacer 246 is above the infrared sensing material layer 244 and extends along a sidewall of the light absorbing layer 245. The light shielding layer 247 is conformally formed on a top surface of the light absorbing layer 245 and the sidewall spacer 246. The light absorbing layer 245, a sidewall spacer 246, and a light shielding layer 247 non-overlap the adjacent reference pixel 231 (see FIG. 14).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An infrared sensor, comprising:
   a substrate;
   an active pixel array over the substrate;
   a reference pixel array over the substrate, adjacent to the active pixel array, and having a first reference pixel, the first reference pixel comprising:
      a first platform;
      a first resistor on the first platform; and
      a first infrared sensing material layer over the first resistor;
   a first light absorbing layer over the first reference pixel;
   a first sidewall spacer over the first reference pixel, the first sidewall spacer laterally abutting a protruding portion of the first light absorbing layer and extending vertically along a sidewall of the protruding portion; and
   a first light shielding layer conformally formed over the first light absorbing layer and the first sidewall spacer.

2. The infrared sensor of claim 1, wherein the first light absorbing layer extends beyond opposite edges of the first platform.

3. The infrared sensor of claim 2, wherein the reference pixel array further comprises a second reference pixel adjacent to the first reference pixel, the first light absorbing layer extending to the second reference pixel and overlapping the second reference pixel.

4. The infrared sensor of claim 1, wherein the reference pixel array further comprises a second reference pixel adjacent to the first reference pixel, the first light absorbing layer non-overlapping the second reference pixel.

5. The infrared sensor of claim 4, wherein the second reference pixel comprises:
   a second platform;
   a second resistor on the second platform; and
   a second infrared sensing material layer over the second resistor, the infrared sensor further comprising:
   a second light absorbing layer over the second reference pixel;
   a second sidewall spacer over the second reference pixel and extending along a sidewall of the second light absorbing layer; and
   a second light shielding layer conformally formed over the second light absorbing layer and the second sidewall spacer.

6. The infrared sensor of claim 1, wherein the first sidewall spacer is made of a different than the first light absorbing layer.

7. The infrared sensor of claim 1, wherein the first sidewall spacer is made of silicon oxide, and the first light absorbing layer is made of silicon nitride.

8. The infrared sensor of claim 1, wherein the first light shielding layer has an inverted U-shaped cross section.

9. The infrared sensor of claim 1, wherein the first light shielding layer is made of a conductive material.

10. The infrared sensor of claim 1, wherein the first infrared sensing material layer is made of vanadium oxide.

* * * * *